Feb. 12, 1963   G. MORESSÉE ET AL   3,077,548
MAGNETIC CIRCUIT STRUCTURE FOR ROTARY ELECTRIC MACHINES
Filed March 21, 1960                           2 Sheets-Sheet 1

INVENTORS
Georges Moressée
Robert Dechet
BY
Pierce Scheffler & Parker
Attorneys

Feb. 12, 1963 — G. MORESSÉE ET AL — 3,077,548

MAGNETIC CIRCUIT STRUCTURE FOR ROTARY ELECTRIC MACHINES

Filed March 21, 1960 — 2 Sheets-Sheet 2

INVENTORS
Georges Moressée
Robert Dechet
BY
Pierre Scheffler & Parker
Attorneys

United States Patent Office 3,077,548
Patented Feb. 12, 1963

3,077,548
MAGNETIC CIRCUIT STRUCTURE FOR ROTARY
ELECTRIC MACHINES
Georges Moressée, Neuilly-sur-Seine, and Robert Déchet,
Boulogne-sur-Seine, France, assignors to Normacem
S.A., Paris, France, a body corporate of France
Filed Mar. 21, 1960, Ser. No. 16,327
Claims priority, application France April 21, 1959
6 Claims. (Cl. 310—154)

The present invention relates generally to an improved magnetic circuit structure for rotary electric machines, and more particularly to a stator structure for rotary electric apparatus including a pair of annular magnet members each having formed therein a plurality of permanently magnetized polar portions and means for angularly adjusting said magnetic members relative to each other to vary the magnitude of flux being cut by the armature windings.

It is known to obtain excitation for rotary electric apparatus—such as motors, generators, or the like—by the use of a ferromagnetic yoke to which is attached magnetic poles of opposite polarity. Unfortunately, machines using such magnetic circuit means have certain drawbacks, such as the requirement of a large number of elements, complicated manufacture and assembly, and machining after assembly to obtain a geometrically precise air gap. In order to adjust the magnetic circuit for a desired performance rating, a magnetic ring must be provided to shunt more or less of the inductive flux as necessary.

It is also known to replace the family of permanent magnets of the apparatus described above with a single magnet joined to two polar extensions which are so formed that each one provides half the number of poles desired and presents, along the air gap, the successively-alternately-arranged polar regions.

The primary object of the present invention is to provide a simple, inexpensively-manufactured magnetic circuit for rotary electrical machines having means for readily adjusting—during actual operation—the magnitude of flux being cut by the rotary armature windings so that the operation of the device may be varied as desired.

According to the present invention the mono- or multi-polar magnetic circuit includes a pair of magnet members, each of which is formed from a ferromagnetic material having a strong remanence and a very high coercive force, such as a suitable metallic alloy (notably ferrites or agglomerates, isotropic or not). By a known magnetization treatment (described in our prior U.S. application Serial No. 16,326, filed March 21, 1960), permanent polar regions of successive alternate polarity are formed in the magnet members. The magnet members are arranged for rotational angular adjustment relative to each other so that by the relative positions of the north and south poles of one magnet member to the north and south poles of the other magnet member, the magnitude of the air gap flux may be varied as desired to control the operation (voltage of a generator, operating speed of a motor, etc.) of the machine as desired. Assuming that each of the magnet members has the same number of north and south polar regions, the air gap flux is a maximum when the north and south poles of one magnet member are opposite the north and south poles of the other magnet member, and a minimum when the north poles of one member are opposite the south poles of the other member. For intermediate positions of the magnet members the flux will vary accordingly.

The present invention lends itself readily to the manufacture of a large number of modifications for apparatus of limited physical dimensions; not only may the apparatus be designed to have a great number of magnetic circuits or a large selection in the number of poles, but also the magnitude of the air gap flux may be readily adjusted as desired. By use of the adjustable dual magnet member arrangement, the voltage at the machine terminal, the speed, or the torque, may be easily and simply adjusted as desired.

Thus the primary object of the present invention is to provide a stator magnetic circuit including a pair of magnet members each having permanently magnetized polar regions therein, and means for angularly adjusting the positions of the magnet members relative to each other to vary the magnitude of the air gap flux.

A more specific object of our invention is to provide an axial-air-gap machine having a stator magnetic circuit including a pair of concentrically arranged annular magnet members each having a number of permanently magnetized polar portions therein; and means for angularly adjusting the positions of said magnet members relative to each other to vary the magnitude of the air gap flux.

Another object of the invention is to provide an axial air gap machine having a stator magnetic circuit including a pair of identical magnet members arranged colinearly on opposite sides of an armature disk, each of said magnet members having the same number of permanently magnetized polar portions therein, and means for angularly rotatably adjusting the positions of said annular members relative to each other to adjust the magnitude of the air gap flux.

A further object of the present invention is to provide a radial air gap machine having a stator including a pair of colinearly-arranged annular magnet members and an armature rotatably mounted concentrically within said annular magnet members, each of said annular magnet members having a plurality of north and south polar regions permanently magnetized therein, said annular magnet members being mounted for rotational angular adjustment relative to each other to vary the magnitude of the air gap flux.

Other objects and advantages of our invention will become apparent from a study of the following specification when considered in conjunction with the accompanying drawings in which.

Figure 4:
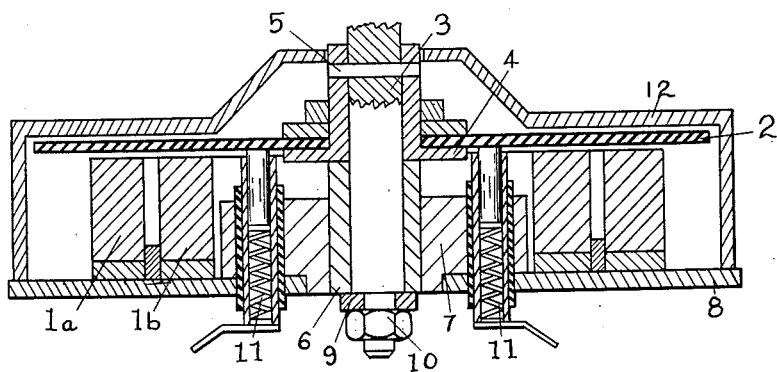
Figure 5:
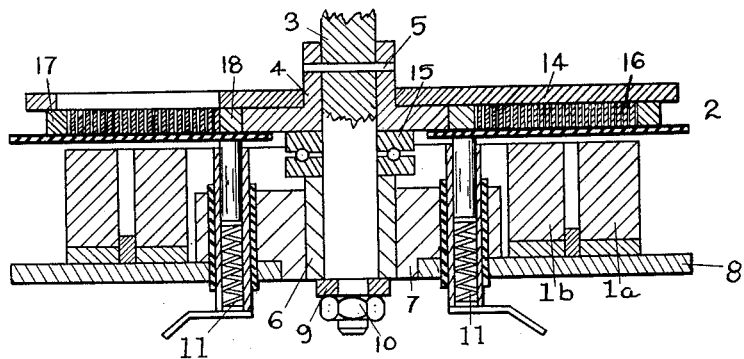

FIG. 4 is a longitudinal sectional view of a second embodiment of axial air gap machine having a soft iron housing substantially completely enclosing the armature and the annular magnetic members; and FIG. 5 is a longitudinal sectional view of another embodiment of axial air gap machine having a ferromagnetic member secured to the opposite side of the armature from the magnet members for closing the magnetic circuit.

Figure 1:
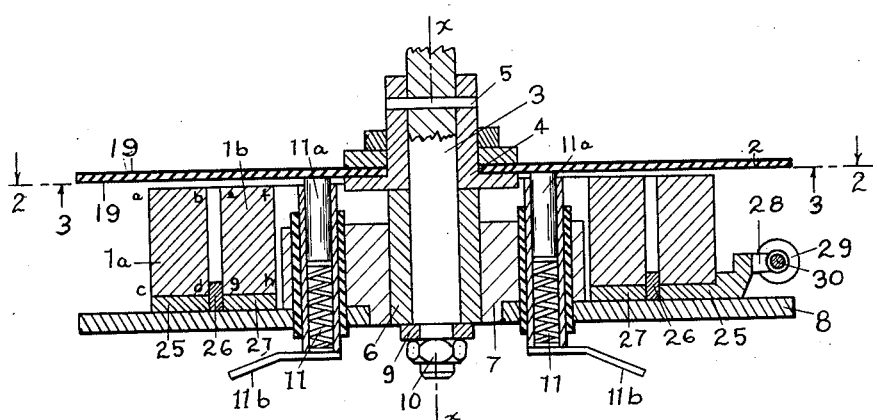
FIG. 1 is a longitudinal sectional view of one embodiment of an axial air gap machine of the direct current type constructed in accordance with the present invention.
Figure 2:
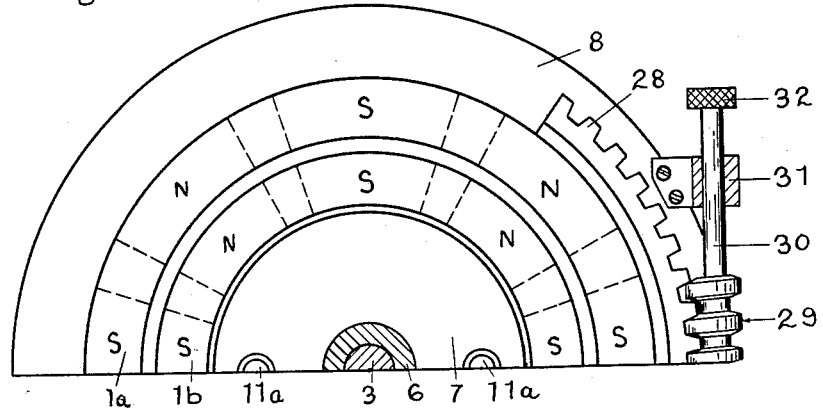
FIG. 2 is a partial sectional view taken along line 2—2 of FIG. 1.
Figure 3:
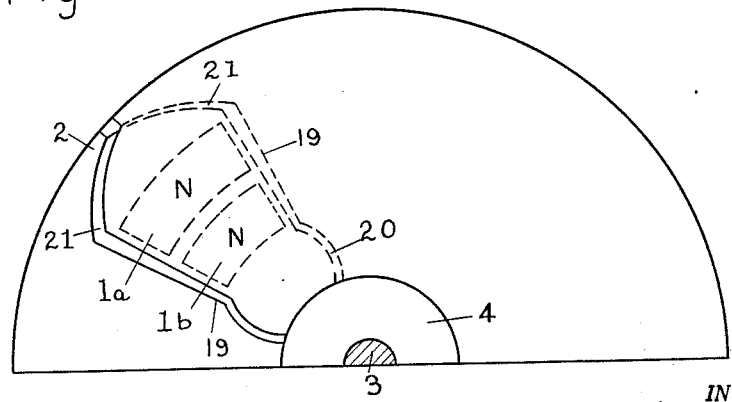
FIG. 3 is a partial sectional view taken along line 3—3 of FIG. 1.

Referring now to the embodiment of FIGS. 1–3, the axial air gap machine includes a pair of concentrically-arranged annular magnet members $1a$, $1b$. Annular magnet member $1a$ is defined by the rotation of rectangle $a$—$b$—$d$—$c$ about central axis $x$—$x$, and annular magnet member $1b$ is defined by the rotation of rectangle $e$—$f$—$h$—$g$ about axis $x$—$x$. Spaced from the end faces of magnet members $1a$, $1b$ is the relatively thin armature 2 which consists of a non-conductive supporting disk (made of paper, synthetic plastic, or other suitable material) on which are arranged the coils 19 as shown in FIG. 3. The flat coils are preferably—although not necessarily—formed on the supporting disk by known printed circuitry techniques. The armature 2 is connected to flanged sleeve 4 which is non-rotatably secured to spindle 3 by the pin 5. Spindle 3 rotates in the self-lubricated bearing sleeve 6 which is mounted in the ring 7 secured to the stator plate 8, said stator plate being preferably made of a ferromagnetic material. The magnet members are connected to the stator plate 8; in accordance with the present invention at least one of the magnet members (1a) is adjustably connected to the stator plate 8 so that it may rotate about axis x—x for angular adjustment relative to the other annular member (1b). The axial air gap between the rotary armature 2 and the adjacent end faces of the annular magnets 1a, 1b is determined by the length of bearing sleeve 6, and by the thickness of washer 9 and the setting of nut 10 on the threaded end portion of spindle 3. The carbon brushes 11a are biased into frictional engagement with the coil turn sides on the adjacent face of the armature 2 by the conductive springs 11 connected at their lower ends to the electrical terminals 11b.

The flat coils 19 on the armature disks have coil sides intermediate coil heads 21 and the end portions 20, which end portions 20 are engaged by the spring-biased carbon brushes 11a. Possibly the brushes will also rub against portions of the sides of coils 19.

As shown in FIG. 2, each of magnet members 1a, 1b has formed therein permanent magnet pole portions of successively-arranged alternate polarity. In the illustrated apparatus each annular magnet member has eight permanent poles formed therein by a known magnetization process (as described in our prior U.S. patent application Serial No. 16,326, filed March 21, 1960).

The cross-sectional configurations of the permanently magnetized pole portions in the annular magnet members may be selected as desired.

The means for angularly adjusting the concentric magnet members 1a, 1b relative to each other will now be described. As shown in FIGS. 1 and 2, a pinion segment 28 is secured to the outer annular magnet member 1a by means of ferromagnetic plate 25 movably connected to stator plate 8. The inner magnet member 1b is fixedly connected to the stator plate 8 by means of the ferromagnetic plate 27. The non-magnetic ring 26 serves as a common centering means for the two magnet members. Worm screw 29 has teeth in threaded engagement with the teeth of pinion segment 28. The spindle portions 30 of worm 29 are mounted in bearings 31 fixed to the stator plate 8. It is now obvious that rotation of worm 29 (by its knurled head portion 32, for example) will affect angular adjustment of outer magnet member 1a about axis x—x relative to the inner stationary magnet member 1b.

When the magnet members 1a, 1b have the angular relationship illustrated in FIG. 2 with the north and south pole portions of outer magnet member 1a being opposite, respectively, the north and south pole portions of inner magnet member 1b, the flux being cut by the coil sides on the rotating armature 2 will be a maximum. On the other hand, if worm 29 is rotated to angularly displace the outer magnet member 1a about axis x—x to a position with the north pole portions of one magnet member being opposite the south pole portions of the other magnet member, then the flux being cut by the armature-carried windings will be a minimum (i.e., substantially zero). For intermediate angular adjustments between these maximum and minimum settings of the inner and outer magnet members relative to each other, the magnitude of flux being cut by the armature windings will vary correspondingly.

Thus by adjusting the angular relationship of the inner and outer annular magnet members relative to each other about axis x—x, an operator may readily control the operating conditions of the axial air gap machine by control of the magnitude of flux being cut by the rotating armature coils.

As shown in FIG. 4, the machine of FIG. 1 may be provided with a soft iron housing 12 secured to the stator plate 8. An end wall portion of this housing extends behind the armature disk on the opposite side thereof from the magnet members 1a, 1b. This end wall portion serves to close the flux paths crossing from the magnet members 1a, 1b through the armature 2. In order to further improve the closing of the magnetic circuit and to reduce the air gap, a soft ferrite disk may be attached to the armature 2 on the opposite side thereof from the magnet members.

Referring now to the embodiment of FIG. 5, for closing the magnetic flux circuit a compact spiral 16 formed from a coiled sheet metal ribbon may be secured to the armature 2 on the opposite side thereof from the magnet members. Rings 17 and 18—positioned intermediate armature 2 and crown 14 secured to flanged sleeve 4—serve to maintain the spiral 16 in its tightly coiled state. Ball bearing means 15 may be provided to support the rotating armature assembly against the attracting force of the magnet members.

In the embodiments of FIGS. 4 and 5 the magnet members 1a, 1b are angularly adjustable relative to each other by either the worm-pinion means according to the embodiment of FIG. 1, or by any other suitable adjusting means.

While the disk armatures of FIGS. 1–5 preferably have the armature conductors applied thereto by printed circuitry techniques, the armatures could also be conventionally made with windings inserted in slots in a ferromagnetic mass, for example.

Although the annular magnet members illustrated in the drawings have been illustrated as having a rectangular cross section, annular magnet members having other types of cross-sectional configurations may be used equally as well.

The use of a series of coaxially-arranged magnetic circuits is also contemplated according to the invention in order to provide multiple-armature machines carried by the same spindle.

While in accordance with the patent statutes we have illustrated and described the best forms and embodiments of our invention as presently known to us, it will be apparent to those skilled in the art that other changes may be made in the apparatus described without deviating from the invention set forth in the appended claims.

We claim:

1. In a rotary electrical machine, the combination comprising a first annular magnet member, a second annular magnet member surrounding said first annular magnet member and arranged concentrically therewith to establish a common rotational axis for the said machine, each said annular magnet member having formed therein a circumferentially extending plurality of permanently magnetized polar regions alternating in polarity in a circumferential direction, a disk type armature having interconnected winding elements on opposite faces thereof, said armature disk being mounted concentric with said first and second annular magnet members and located adjacent like end faces thereof to establish an axially extending air gap therebetween, and means for rotatably adjusting one of said annular magnet members relative to the other about said common axis to vary the magnitude of the magnetic flux at said air gap, the maximum amount of air gap flux being established when like poles on said annular magnet members are disposed opposite each other and the air gap flux being diminished as said like poles are rotationally adjusted in a direction away from each other.

2. Apparatus as defined in claim 1 wherein said means for angularly adjusting said magnet members relative to each other about their common axis comprises worm and pinion means.

3. Apparatus as defined in claim 1 wherein said electrical machine includes a frame, and further wherein at least one of said annular magnet members is adjustably connected to said frame by ferromagnetic plate means.

4. Apparatus as defined in claim 1 wherein said electrical machine further includes a frame having two relatively movable parts, one of said annular magnet members being connected to one of said frame parts and the other of said annular magnet members being connected to the other of said frame parts.

5. Apparatus as defined in claim 1 and further including ferromagnetic means on the opposite side of said armature disk from said annular magnet members providing a flux closing path for the flux passing from the annular magnet members through the armature disk.

6. Apparatus as defined in claim 1 wherein said first and second annular magnet members have the same length as measured in an axial direction and have a rectangular configuration in transverse section.

References Cited in the file of this patent

UNITED STATES PATENTS

| | | |
|---|---|---|
| 996,253 | Johnson | June 27, 1911 |
| 2,361,239 | Ransom | Oct. 24, 1944 |
| 2,465,932 | Romine | Mar. 29, 1949 |
| 2,503,704 | Bessiere | Apr. 11, 1950 |
| 2,675,494 | Ellis | Apr. 13, 1954 |

FOREIGN PATENTS

| | | |
|---|---|---|
| 10,006 | Great Britain | of 1886 |